United States Patent [19]

Errante

[11] Patent Number: 5,357,843
[45] Date of Patent: Oct. 25, 1994

[54] HYDRAULIC PUMPS OR MOTORS OF THE RADIAL CYLINDER TYPE

[76] Inventor: Ester Errante, Via dei Sessanta 18, 16152 Genova, Italy

[21] Appl. No.: 33,770

[22] Filed: Mar. 18, 1993

Related U.S. Application Data

[63] Continuation-in-part of Ser. No. 809,475, Dec. 24, 1991.

[30] Foreign Application Priority Data

Apr. 24, 1990 [IT] Italy .................. 12450 A/90

[51] Int. Cl.$^5$ ............................................. F01B 13/06
[52] U.S. Cl. .................................. 91/491; 417/273; 92/72
[58] Field of Search ............. 417/273; 92/72; 91/491, 91/498

[56] References Cited

U.S. PATENT DOCUMENTS

| | | | |
|---|---|---|---|
| 1,533,514 | 4/1925 | Ragot | 92/72 |
| 2,130,299 | 2/1936 | Ernst | 91/498 |
| 2,189,773 | 2/1940 | Benedek | 91/492 |
| 2,217,796 | 10/1940 | Dell | 417/273 |
| 3,122,971 | 3/1964 | Russell | 91/491 |
| 4,719,843 | 1/1988 | Nöel | 91/491 |
| 5,004,406 | 4/1991 | Kuroyanagi et al. | 417/273 |

FOREIGN PATENT DOCUMENTS

| | | | |
|---|---|---|---|
| 1335536 | 7/1963 | France . | |
| 123772 | 6/1986 | Japan | 417/273 |
| 152971 | 7/1986 | Japan | 417/273 |
| 2209059 | 4/1989 | United Kingdom . | |

*Primary Examiner*—Richard A. Bertsch
*Assistant Examiner*—Roland G. McAndrews, Jr.
*Attorney, Agent, or Firm*—Sughrue, Mion, Zinn, Macpeak and Seas

[57] ABSTRACT

A radial cylinder hydraulic pump or motor has radial pistons each provided with a guide pad urged against the cylindrical inner surface of a guide element. A continuous series of rollers cover the cylindrical inner surface and are interposed between such surface and the guide pads. The rollers are prevented from coming in contact with each other by a number of auxiliary smaller rollers. Between each piston and its respective guide pad there is interposed a sliding member which is slidably mounted on the pad along a tangential direction.

3 Claims, 3 Drawing Sheets

HYDRAULIC PUMPS OR MOTORS OF THE RADIAL CYLINDER TYPE

This is a continuation-in-part of application Ser. No. 07/809,475 filed Dec. 24, 1991.

BACKGROUND OF THE INVENTION

The present invention relates to hydraulic pumps or motors of the radial cylinder type.

With reference to FIG. 1 of the annexed drawings, a conventional radial cylinder hydraulic pump or motor comprises a stator with a hollow guide element 1 having a cylindrical inner surface 2 and a rotor 3 which is rotatably mounted within the guide element 1 around an axis 4 which is offset from the axis of the cylindrical surface 2. The rotor 3 has a number of radial cylinders 5 wherein radial pistons 6 are slidably mounted. Each piston 5 is provided at its radially outer end with a guide pad 7 which slides on the inner surface 2 of the guide element 1. A fixed cylindrical body 8 is arranged within an inner cavity of the rotor 3 and is provided with inlet and outlet ducts for the oil. In the operation as a pump, the rotor 3 is caused to rotate by a motor (not shown) so that the radial pistons 6 are urged outwardly by centrifugal force. In some cases, springs or fluid pressure coming from an auxiliary pump are exploited in order to increase the thrust urging the radial pistons outwardly.

In the above described conventional construction, the pads 7 are pivotally connected to the respective pistons and are pressed against the surface 2 of guide element 1 with the interposition of a film of oil under pressure fed through a hole formed through the pad itself. Such a construction is not completely satisfactory, since it poses a limitation to the offset degree of axis 4 and to the speed of the rotor.

From U.S. Pat. No. 2.130.299 to Ernst a radial piston pump or motor is known wherein a continuous series of rollers is provided covering the inner surface of the guide element 1 and interposed between each piston pad and the inner surface of the guide element. In this case, however, each pad is connected to the respective piston through the engagement of the outer end of the piston in a seat of the pad. Also, this known construction can be operated only with a minimun offset degree of the rotor axis and therefor poses again a limitation to the capacity and power of the pump. The reason of this limitation is that, due to the offset position of the rotor axis, each pad and the outer end of the respective piston have a displacement relative to each other also in a tangential direction with respect to the rotor axis. Moreover, power losses occur as a consequence of the contact between adjacent rollers, which have opposed local speeds in the point of contact.

SUMMARY OF THE INVENTION

The main object of the present invention is to provide a radial cylinder pump or motor which overcomes the above mentioned drawbacks.

In order to achieve this object, the invention provides a radial cylinder hydraulic pump or motor, comprising:
- a stator with a hollow guide element, having a cylindrical inner suface,
- a rotor which is rotatably mounted within said guide element around an axis offset from the axis of said cylindrical inner surface, said rotor having a plurality of radial cylinders formed therein,
- a plurality of radial pistons slidably mounted within said cylinders and having radially outer ends, each end being provided with a guide pad urged against said cylindrical inner surface,
- a continuous series of main rollers, covering said cylindrical inner surface and interposed between said inner surface and Said guide pads of said radial pistons, said rollers having their ends supported by two supporting rings connected to said guide element,
- a plurality of auxiliary rollers interposed in the space between each pair of adjacent main rollers and said cylindrical inner surface to prevent a direct contact of said adjacent main rollers, the space where said main rollers and auxiliary rollers are located being completely filled with oil,
- wherein each of said guide pads is provided on its side facing the respective radial piston with a sliding member which is interposed between the pad and the piston, said sliding member being slidably mounted on said guide pad between two end positions along a tangential direction with respect to the axis of said rotor, each pad being provided with springs means for urging the respective sliding member towards an intermediate position between said end positions.

In the construction according to the invention, due to the presence of a sliding member interposed between each piston and its respective pad, relative movements of the pad and the piston along a tangential direction are possible, so that the machine can operate properly even with a high offset degree of the rotor axis. At the same time, due to the presence of the auxiliary rollers, any direct contact between adjacent ones of the mains rollers is prevented, thus avoiding any power loss. In other words, the inner surface of the guide element is covered with the maximum possible number of main rollers, while avoiding at the same time direct contact of said rollers. Thus, a very high pressure can be distributed among a high number of rollers, while avoiding at the same time any friction loss.

Due to the above features, the machine according to the invention can provide a capacity and power much greater than those of the machines according to the prior art.

BRIEF DESCRIPTION OF THE DRAWINGS

Further features and advantages of the invention will become apparent from the following description, provided purely by way of example, with reference to the annexed drawings in which.

DETAILED DESCRIPTION OF THE PREFERRED EMBODIMENTS

Figure 1:
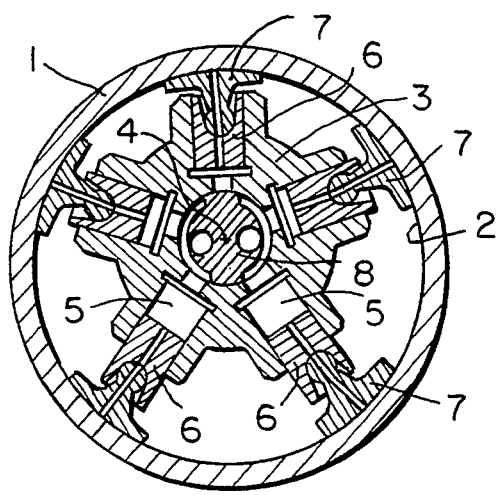
FIG. 1 is a cross-sectional view of a radial cylinder motor or pump according to the prior art.
Figure 2:
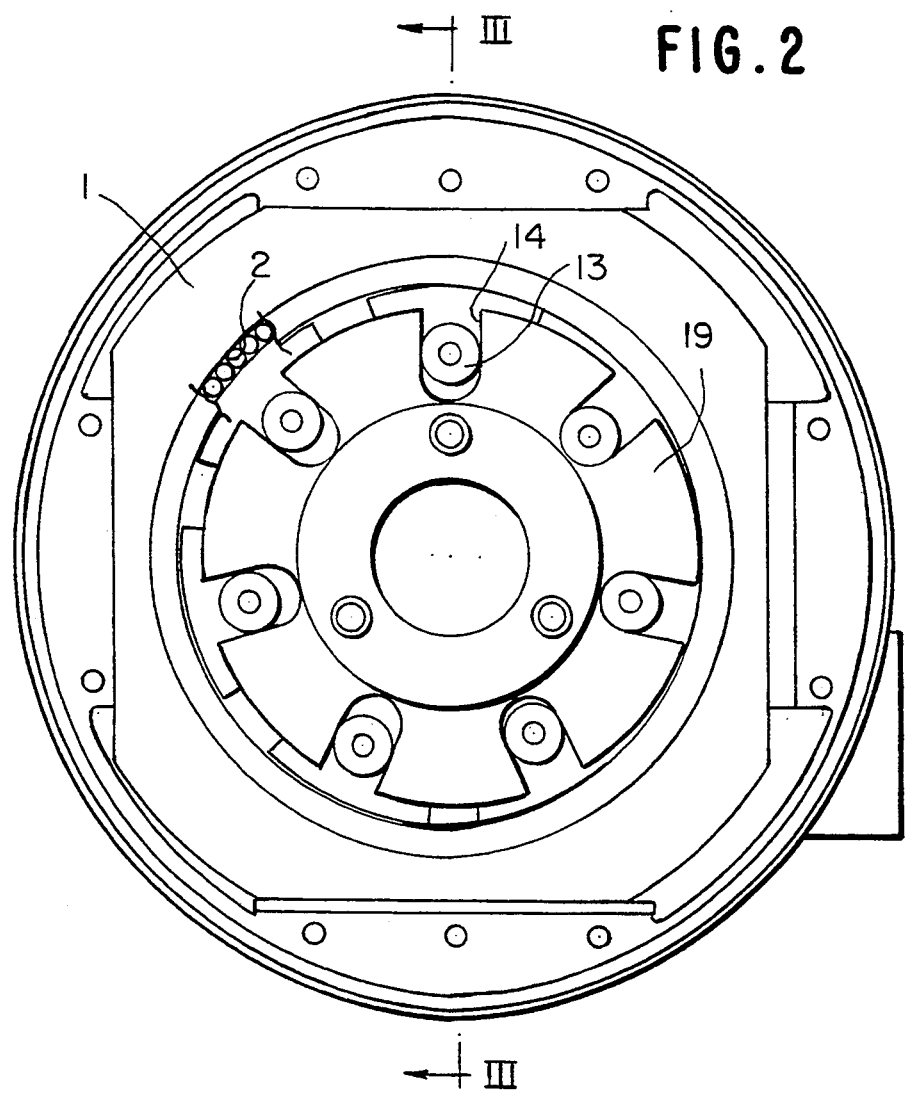
FIG. 2 is a front view, partially in cross-section, of a radial cylinder motor or pump according to the invention.

The conventional construction shown in FIG. 1 has been explained already at the beginning of the present description.

The structure of the machine according to the invention will be now described with reference to FIGS. 2–8. In these figures, parts corresponding to those illustrated in FIG. 1 have been designated by the same reference numerals. With specific reference to FIG. 3, a radial cylinder motor or pump of the invention comprises a stator 1a having a seat 1b for the guide element 1. The inner surface 2 of the guide element 1 is covered by a continuous series of main rollers 9 whose ends are supported by two supporting rings 10, 11 rigidly connected to the guide element 1, The supporting rings 10, 11 each have a L-shaped cross-section. With reference to FIG. 5, in the space between each pair of adjacent rollers 9 and the cylindrical inner surface 2 of the guide element 1 there are provided auxiliary smaller rollers 12, which are chosen of such a size as to prevent direct contact between rollers 9, while allowing the maximum possible number of rollers 9 to be arranged on the surface 2.

Figure 4:
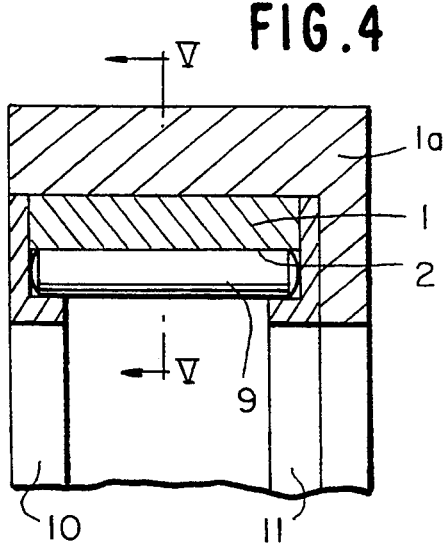
FIG. 4 shows a detail of FIG. 3 at a grater scale and in a simplified manner.
Figure 5:
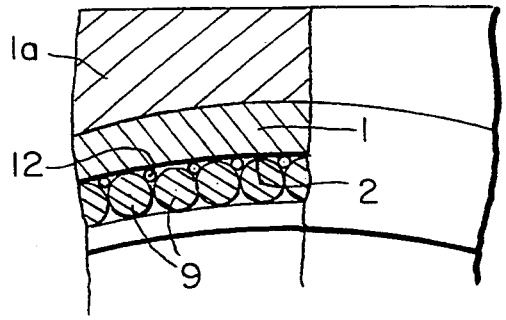
FIG. 5 is a cross-section taken along line V—V of FIG. 4.
Figure 6:
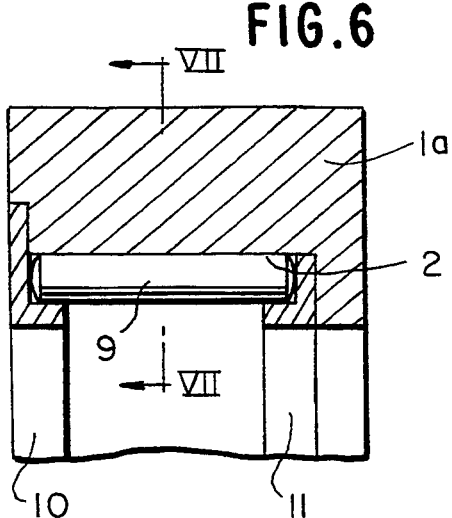
FIG. 6 shows a variant of FIG. 4.
Figure 7:
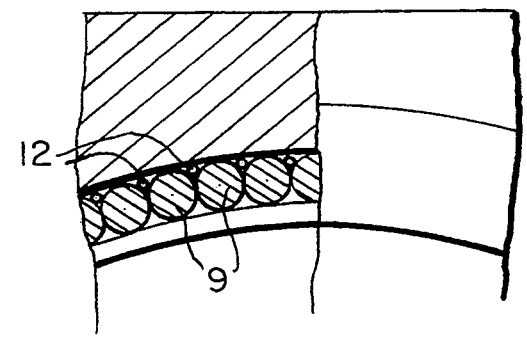
FIG. 7 is a cross-section taken along line VII—VII of FIG. 6.

FIGS. 6, 7 are variants of FIGS. 4, 5 which refer to the case in which the surface 2 is directly provided on the stator 1a.

The various pads associated with the radial pistons 6 are not directly connected to such pistons. As clearly apparent from FIGS. 2, 3, each pad 7 is provided with a freely rotatable wheel 13 which is engaged within a radial slot 14 of a star-shaped portion 19 of the rotor. In this manner, the pads 7 are caused to rotate along with the rotor 3, while slots 13 allow radial movement thereof.

Figure 3:
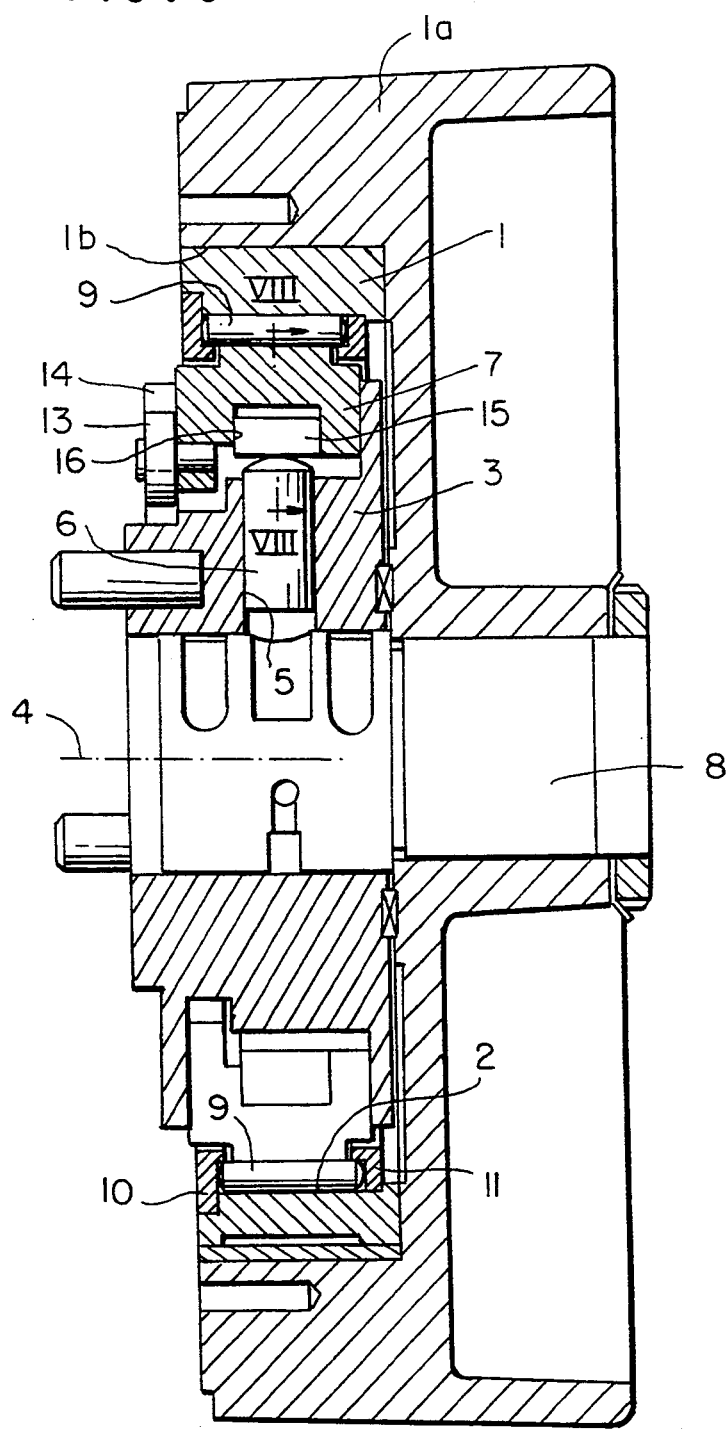
FIG. 3 is a cross-sectional view of the machine according to the invention taken along line III—III of FIG. 2.
Figure 8:
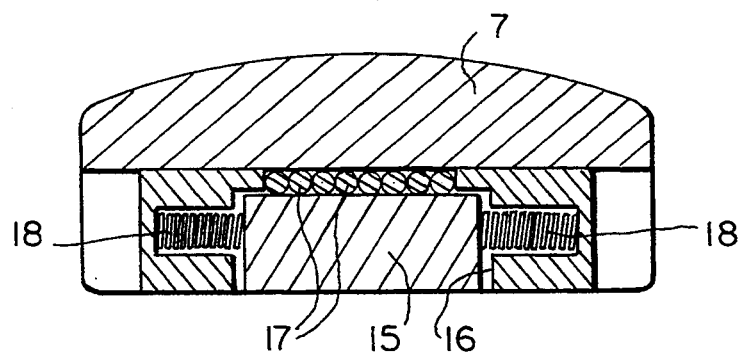
FIG. 8 shows a cross-section taken along line VIII—VIII of FIG. 3.

In order to allow also relative displacements of each pad 7 and the respective piston 6 along the tangential direction, each pad 7 is provided with a sliding member 15 which is interposed between the respective pad 7 and piston 6. As shown in FIG. 3, 8, each sliding member 15 is slidably mounted within a seat 16 formed on the side of pad 7 facing piston 6. As shown in FIG. 8, rollers 17 are interposed between the opposite faces of pad 7 and sliding member 15. Moreover, each pad 7 is provided with opposed springs 18 which bias the sliding member 15 towards an intermediate position between its two end positions.

During the operation, for example as a pump, rotor 3 is caused to rotate by a motor (not shown) through a suitable coupling member, so that pistons 6 are caused to follow the inner cylindrical surface 2 of the guide element 1. During this movement, the thrust of the pistons 6 is distributed among the highest possible number of rollers 9, while losses due to direct contact of rollers 9 are prevented by means of the auxiliary rollers 12. Moreover, tangential movements of each pad 7 relative to the outer end of the respective piston 6 are allowed through the sliding member 15. Any friction is kept at minimum by the oil filling the space where rollers 9 are located.

Due to all the above-indicated features, the invention enables the construction of a pump or a motor with a capacity and power much greater than those possible with the known constructions.

Naturally, the embodiments and the details of construction may widely vary with respect to what has been illustrated herein by way of example, without departing from the scope of the present invention.

I claim:

1. A radial cylinder hydraulic pump or motor, comprising:
   a stator with a hollow guide element having a cylindrical inner surface,
   a rotor which is rotatably mounted within said guide element around an axis offset from the axis of said cylindrical inner surface, said rotor having a plurality of radial cylinders formed therein,
   a plurality of radial pistons slidably mounted within said cylinders and having radially outer ends each provided with a guide pad urged against said cylindrical inner surface,
   a continuous series of main rollers covering said cylindrical inner surface and interposed between said inner surface and each guide pad of said radial piston, said main rollers having ends supported by two supporting rings connected to said guide element,
   a plurality of auxiliary rollers individually interposed in a space between adjacent main rollers and said cylindrical inner surface to prevent direct contact of said adjacent main rollers,
   wherein the space between said main rollers is completely filled with oil, and
   wherein each of said guide pads is provided at a side thereof facing an associated radial piston with a sliding member interposed between the guide pad and the radial piston, said sliding member being slidably mounted on said guide pad between two end positions along a tangential direction with respect to the axis of rotation of said rotor, each guide pad being provided with spring means for biasing said sliding member towards an intermediate position between said two end positions.

2. A radial cylinder pump or motor according to claim 1, wherein the diameter of said auxiliary rollers is sufficient to prevent any contact between said main rollers, while allowing a maximum possible number of main rollers on said cylindrical inner surface.

3. A radial cylinder pump or motor according to claim 1, wherein each of said sliding members is slidably mounted on an associated guide pad with the interposition of a plurality of rollers.

* * * * *